US009771973B2

(12) United States Patent
Ambroise et al.

(10) Patent No.: US 9,771,973 B2
(45) Date of Patent: Sep. 26, 2017

(54) BEARING WITH FLANGE SEGMENTS

(71) Applicant: SAINT-GOBAIN PERFORMANCE PLASTICS PAMPUS GMBH, Willich (DE)

(72) Inventors: Caroline Ambroise, Düsseldorf (DE); Torsten Holzportz, Duisburg (DE); Lukas Plioska, Nettetal (DE)

(73) Assignee: SAINT-GOBAIN PERFORMANCE PLASTICS PAMPUS GMBH, Willich (DE)

(*) Notice: Subject to any disclaimer, the term of this patent is extended or adjusted under 35 U.S.C. 154(b) by 0 days.

(21) Appl. No.: 15/086,513

(22) Filed: Mar. 31, 2016

(65) Prior Publication Data
US 2016/0290390 A1    Oct. 6, 2016

Related U.S. Application Data

(60) Provisional application No. 62/140,841, filed on Mar. 31, 2015.

(51) Int. Cl.
*F16C 17/10*    (2006.01)
*F16C 35/02*    (2006.01)
(Continued)

(52) U.S. Cl.
CPC .......... *F16C 17/10* (2013.01); *F16C 33/046* (2013.01); *F16C 33/14* (2013.01); *F16C 35/02* (2013.01);
(Continued)

(58) Field of Classification Search
CPC ........ F16C 17/10; F16C 33/046; F16C 33/14; F16C 35/02; Y10T 29/49936
See application file for complete search history.

(56) References Cited

U.S. PATENT DOCUMENTS 1,738,037 A * 12/1929 Collins ............... B62D 1/16
16/2.1
1,910,300 A * 5/1933 Marles ............... B62D 1/16
384/296
(Continued)

FOREIGN PATENT DOCUMENTS

DE    2150147 A1    4/1973
EP    2827010 A1    1/2015
(Continued)

OTHER PUBLICATIONS

International Search Report for International Application No. PCT/EP2016/057090 received from the International Search Authority (ISR/EP), dated Jul. 7, 2016, 1 page.
(Continued)

Primary Examiner — Thomas R. Hannon
(74) Attorney, Agent, or Firm — Chi S. Kim; Abel Law Group, LLP

(57) ABSTRACT

A bearing component can include a metal substrate layer, shaped so as to include a generally annular sidewall having a central axis and defining a first and a second opposite ends in an axial direction; and a radial flange bent so as to extend in a radial direction from one of the first and second ends of the generally annular sidewall, wherein, in a pre-shaped state, the metal substrate layer includes at least two flange segments extending in the axial direction and defining a gap extending toward an opening.

18 Claims, 4 Drawing Sheets

(51) Int. Cl.
*F16C 33/04* (2006.01)
*F16C 33/14* (2006.01)
*F16C 33/20* (2006.01)

(52) U.S. Cl.
CPC ........ *F16C 33/208* (2013.01); *F16C 2220/42* (2013.01); *F16C 2220/44* (2013.01); *F16C 2226/52* (2013.01); *F16C 2240/30* (2013.01); *F16C 2240/40* (2013.01); *F16C 2240/60* (2013.01); *F16C 2240/70* (2013.01)

(56) References Cited

U.S. PATENT DOCUMENTS

| | | | | |
|---|---|---|---|---|
| 2,124,132 | A | * | 7/1938 | Bate .......... B21K 1/04 29/898.058 |
| 2,761,202 | A | * | 9/1956 | Beare .......... 228/903 |
| 3,416,847 | A | | 12/1968 | Daley |
| 4,017,127 | A | | 4/1977 | Smith et al. |
| 4,048,703 | A | * | 9/1977 | Lehnhart ........ B21D 53/10 29/898.057 |
| 4,810,105 | A | * | 3/1989 | Arlott .......... F16C 33/22 384/107 |
| 5,273,369 | A | * | 12/1993 | Strobl .......... F16C 23/04 384/192 |
| 5,704,752 | A | * | 1/1998 | Logerot .......... F16B 19/1081 403/248 |
| 6,238,127 | B1 | * | 5/2001 | Jhumra .......... F16B 5/02 384/295 |
| 6,322,081 | B1 | | 11/2001 | Ullah et al. |
| 6,481,895 | B2 | | 11/2002 | Yang et al. |
| 6,921,210 | B2 | | 7/2005 | Welch et al. |
| 7,174,765 | B2 | | 2/2007 | Kirchhof et al. |
| 7,325,402 | B2 | | 2/2008 | Parker et al. |
| 7,354,199 | B2 | | 4/2008 | Welch et al. |
| 8,506,169 | B2 | | 8/2013 | Nakagawa |
| 8,695,699 | B2 | | 4/2014 | Whiddon et al. |
| 9,315,092 | B2 | * | 4/2016 | Zehnder .......... B60J 7/1265 |
| 2005/0154392 | A1 | | 7/2005 | Medoff et al. |
| 2009/0110338 | A1 | | 4/2009 | Blase et al. |

FOREIGN PATENT DOCUMENTS

| | | |
|---|---|---|
| GB | 2126669 A | 3/1984 |
| WO | 02070908 A1 | 9/2002 |

OTHER PUBLICATIONS

Plastic Flanged Sleeve Bearings with High Temperature Resistance, <http://www.danaherspecialtyproducts.com/Thomson_Nyliner/Products>, dated Jul. 5, 2014, 2 pages.

* cited by examiner

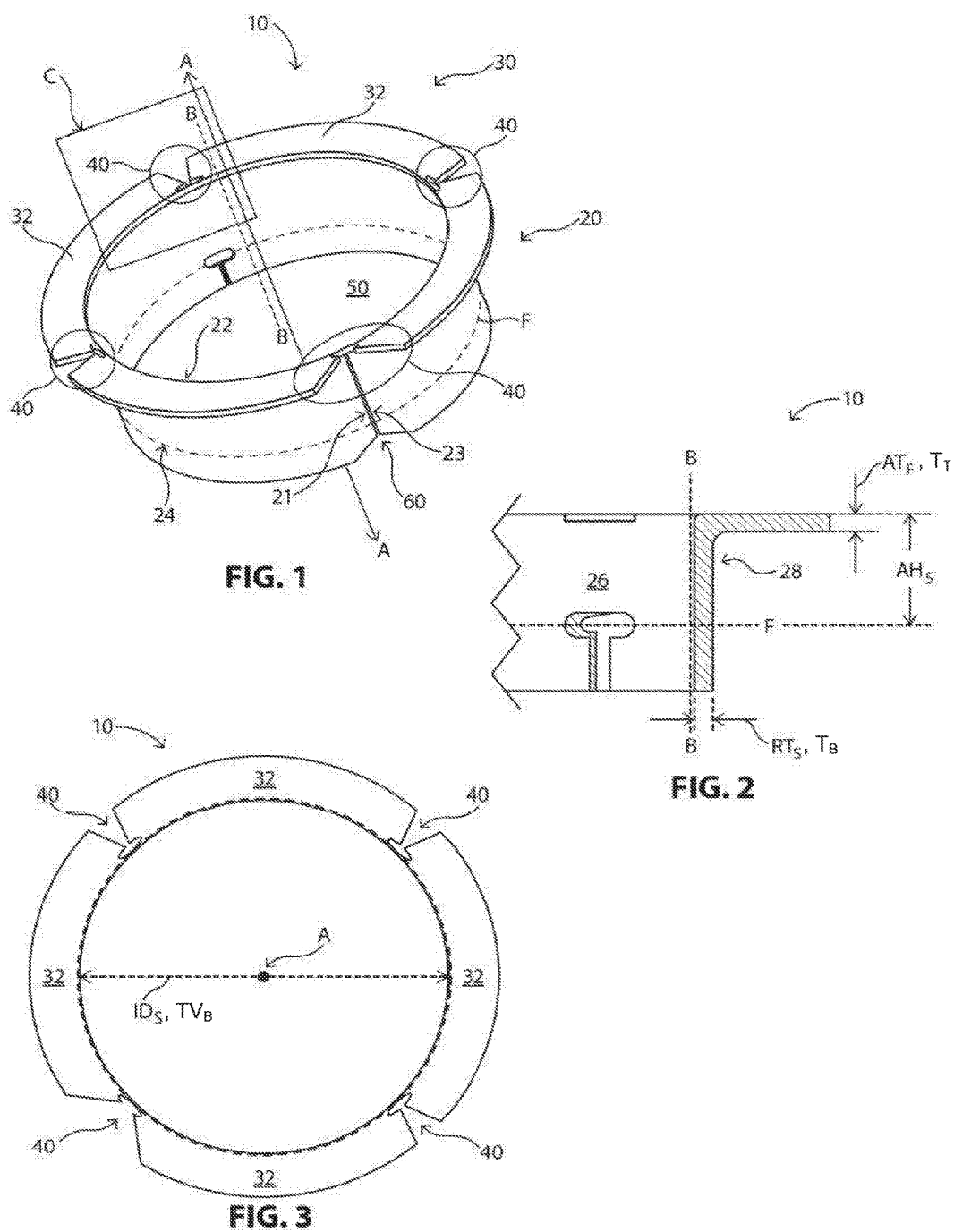

BEARING WITH FLANGE SEGMENTS

CROSS-REFERENCE TO RELATED APPLICATION(S)

This application claims priority under 35 U.S.C. §119(e) to U.S. Patent Application No. 62/140,841 entitled "BEARING WITH FLANGE SEGMENTS," by Caroline Ambroise, et al., filed Mar. 31, 2015, which is assigned to the current assignee hereof and incorporated herein by reference in its entirety.

FIELD OF THE DISCLOSURE

The present disclosure relates to bearings, bearing preassemblies, and methods of making bearings.

RELATED ART

Bearings provide low friction interfaces between two components which are movable with respect to one another. For example, a bearing can be inserted into a housing for a shaft and the shaft can interface with a low friction surface of the bearing. The bearing can include a radial flange to assist in axially locating the bearing relative to the shaft. However, axial forces imposed on the radial flange can cause cracks to form in the bearing, which can deteriorate the low friction interfacing properties of the bearing. Accordingly, there exists a need for an improved flanged bearing.

BRIEF DESCRIPTION OF THE DRAWINGS

Embodiments are illustrated by way of example and are not limited in the accompanying figures.

FIG. 1 includes an illustration of an example bearing component according to certain embodiments of this disclosure.

FIG. 2 includes an illustration of a representative cross-section of the bearing component illustrated in FIG. 1.

FIG. 3 includes an illustration of a representative top view of an axial end of the bearing component illustrated in FIG. 1.

Figure 4:
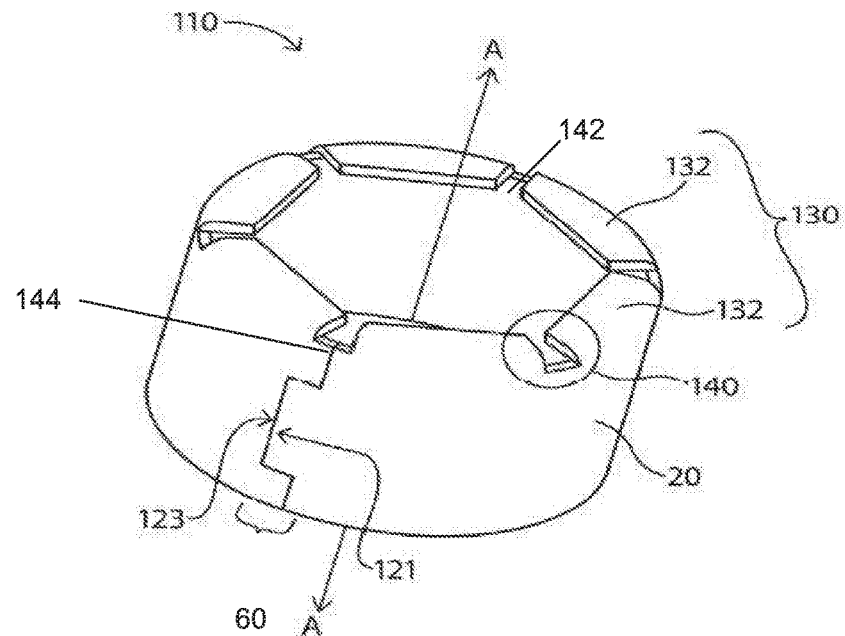
FIG. 4 includes an illustration of another example bearing component according to certain embodiments of this disclosure.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the bearing arts.

Described herein are embodiments of a bearing component, a bearing component preassembly, and a method of shaping a bearing component preassembly to make a bearing component. Certain embodiments of the bearing component can include a generally annular sidewall, a segmented radial flange extending from the sidewall, and a split feature extending between segments of the flange and into the sidewall. Certain embodiments of the bearing component preassembly can include a body, a segmented axial tab extending from the body, and a gap feature extending between segments of the tab and into the body. Certain embodiments of the method of making a bearing component can include shaping a bearing component preassembly to form a bearing component. For example, the method can including shaping a body into a generally annular sidewall and shaping a segmented tab into a segmented radial flange.

As will be discussed in more detail below, it is a particular advantage of certain embodiments of the bearing component, the bearing component preassembly, or the method to achieve a bearing component having a segmented flange that remains substantially free of cracks, even when the segmented flange is large relative to the sidewall. In particular embodiments, the bearing component can include a split feature that provides stress relief, such as during the shaping of the flange or the sidewall, to assist in avoiding the formation of cracks in the sidewall. The concepts are better understood in view of the embodiments described below that illustrate and do not limit the scope of the present invention.

FIG. 1 includes an illustration of an example bearing component 10 according to certain embodiments of this disclosure. As illustrated in FIG. 1, the bearing component 10 can include a generally annular sidewall 20, a segmented radial flange 30 extending from the sidewall 20, and a split feature 40 extending from the sidewall 20 between segments 32 of the flange and into the sidewall 20. It is to be understood that the embodiment illustrated in FIG. 1 is an illustrative embodiment. All of the items illustrated are not required, and any number of additional items, or fewer items, or different arrangement of items than shown is within the scope of the present disclosure.

As illustrated in FIG. 1, the sidewall 20 can have a first axial end 22 and a second axial end 24. The axial direction can be defined by a central axis A of the sidewall 20 extending through the opposing planes along which the first and second axial ends 22, 24 lie.

The sidewall 20 can have an axial height $AH_S$ defined as the distance between the first axial end 22 and the second axial 24. In certain embodiments, the sidewall can have an axial height $AH_S$ of at least 7 mm, such as at least 8 mm, or even at least 9 mm. In further embodiments, the sidewall can have an axial height $AH_S$ of no greater than 45 mm, such as no greater than 35 mm, or even no greater than 30 mm. Moreover, the sidewall can have an axial height $AH_S$ in a range of any of the above minimum or maximum values, such as 7 to 45 mm, 8 to 35 mm, or even 9 to 30 mm.

As illustrated in FIG. 2, the sidewall 20 can have an inner surface 26 and an opposite outer surface 28. The inner surface 26 can face toward the central axis A and the outer surface can face away from the central axis A. The inner surface 26, the outer surface 28, or both the inner and outer surfaces 26, 28, can be a smooth surface. Further, the inner surface 26 can be concentric with the outer surface 28.

Further, FIG. 2 includes an illustration of a representative cross-section of the bearing component 10 along the line B of FIG. 1. The cross-section in FIG. 2 illustrates that the sidewall 20 can have a radial thickness $RT_S$ defined as the distance from the inner surface 26 to the outer surface 28. In certain embodiments, the sidewall 20 can have a radial thickness $RT_S$ of at least 0.2 mm, such as at least 0.4 mm, at least 0.6 mm, or even at least 0.8 mm. In further embodiments, the sidewall 20 can have a radial thickness $RT_S$ of no greater than 10 mm, such as no greater than 8 mm, no greater than 6 mm, no greater than 4 mm, or even no greater than 2 mm. Moreover, the sidewall 20 can have a radial thickness $RT_S$ in a range of any of the above maximum and minimum values, such as 0.2 to 10 mm, 0.4 to 8 mm, 0.6 to 6 mm, 0.8 to 4 mm, or even 0.8 to 2 mm. In particular embodiments, the radial thickness $RT_S$ of the sidewall 20 can be substantially constant from the first axial end 22 to the second axial end 24. In further particular embodiments, the radial thickness $RT_S$ can substantially increase as it approaches one of the first axial end 22 or the second axial end 24.

As illustrated in FIG. 1, the inner surface 26 can define a through center aperture 50 adapted to receive a shaft. For example, the inner surface 26 can be a shaft-interface surface adapted to interface with a shaft, such as a rotating or sliding shaft. Further, the outer surface 28 can be a housing-interface surface adapted to interface with a housing for a shaft, such as a housing for a rotating or sliding shaft.

FIG. 3 includes an illustration of a representative top view of the first axial end 22 of the bearing component 10 of FIG. 1. As illustrated in FIG. 3, the sidewall 20 can have an inner diameter $ID_S$ defined by the inner surface 26 of the sidewall 20. In certain embodiments, the sidewall 20 can have an inner diameter $ID_S$ of at least 25 mm, such as at least 30 mm, or even at least 35 mm. In further embodiments, the sidewall 20 can have an inner diameter $ID_S$ of no greater than 300 mm, such as no greater than 275 mm, or even no greater than 250 mm. Moreover, the sidewall 20 can have an inner diameter $ID_S$ in a range of any of the above minimum or maximum values, such as 25 to 300 mm, such as 30 to 275 mm, or even 35 to 250 mm.

Further, the sidewall 20 can have an outer diameter $OD_S$ defined by the outer surface 28 of the sidewall 20. In certain embodiments, the sidewall 20 can have an outer diameter equal to the inner diameter $ID_S$ increased by the radial thickness $RT_S$. In particular embodiments, the inner diameter $ID_S$, the outer diameter $OD_S$, or both the inner diameter $ID_S$ and the outer diameter $OD_S$ can be substantially constant from the first axial end to the second axial end. In further embodiments, the inner diameter $ID_S$, the outer diameter $OD_S$, or both the inner diameter $ID_S$ and the outer diameter $OD_S$ can substantially increase as it approaches one of the first axial end 22 or the second axial end 24.

In certain embodiments, the sidewall 20 can be a discontinuous sidewall. For example, as illustrated in FIG. 1, the sidewall 20 can include opposing circumferential ends 21, 23 that define an axial split 60 extending from the first axial end 22 to the second axial end 24. In certain embodiments, as illustrated in FIG. 1, the axial split 60 can intersect with, such as be contiguous with, a split feature 40. Furthermore, the circumferential ends defining the axial split can be spaced apart, interlocked, welded together, and the like.

The axial split 60 can include a linear axial split or a non-linear axial split. As used herein when referring to the axial split, the term "linear" refers to a split that follows a single direction. FIG. 1 provides an illustration of a linear axial split where the axial split follows a direction that is parallel to the central axis A of the bearing component. It is to be understood that that the linear axial split could also follow a direction that is not parallel with the central axis A of the bearing component. On the other hand, the term "non-linear" refers to an axial split that follows more than one direction. For example, the axial split can be a non-linear axial split as illustrated in FIG. 4, which will be described in more detail below. In particular embodiments, as illustrated in FIG. 4, the circumferential end 121 can include a circumferential protrusion and the circumferential end 123 can include a circumferential indent for receiving the circumferential protrusion. Moreover, the structure of the axial split is not necessarily limited to the description or illustrations described herein but alternative shapes are within the purview of one of ordinary skill in the art.

As to the composition of the sidewall 20, it can include a single layer or multiple layers. For example, in certain embodiments, the sidewall 20 can include a single layer including a substrate layer. In other embodiments, the sidewall 20 can include multiple layers, such as a composite comprising a substrate layer and a low-friction layer.

The substrate layer described above can include a relatively rigid material. In certain embodiments, the substrate layer can include a metal. The term "metal" refers to any metal or alloy depending on the desired application. In particular embodiments, the metal can include a steel, an aluminum, a bronze, a copper, a magnesium, a titanium, a nickel, a zinc, or any combination or alloy thereof.

Further, as used herein, the term "low-friction layer" refers to a layer comprising a material that can reduce friction at an interface between opposing surfaces. For example, in certain embodiments, the low-friction layer can include a polymer. In particular embodiments, the polymer can include a polyketone, a polyaramid, a thermoplastic polyimide, a polyetherimide, a polyphenylene sulfide, a polyethersulfone, a polysulfone, a polyphenylene sulfone, a polyamideimide, an ultra high molecular weight polyethylene, a thermoplastic fluoropolymer, a polyamide, a polybenzimidazole, or any combination thereof.

In certain embodiments of the sidewall including a composite comprising a substrate layer and a low-friction layer, the substrate layer can be disposed adjacent the low-friction layer, such as directly adjacent the low-friction layer without intervening layers. The low-friction layer can be on one or both sides of the substrate layer. In particular embodiments, the low-friction layer can form the inner surface 26 and the substrate layer can form the outer surface 28 of the sidewall 20. In other embodiments, the low-friction layer can form the outer surface 28 of the sidewall 20 and the substrate layer can form the inner surface of the sidewall 20.

As stated previously, the bearing component 10 can include a segmented radial flange 30 extending from the sidewall 20. The segmented radial flange 30 can include a plurality of flange segments 32 extending from the first axial end 22, the second axial end 24, or both the first and second axial ends 22, 24.

In certain embodiments, the segmented radial flange can include at least 2 flange segments, such as at least 3 flange segments, or even at least 4 flange segments. In further embodiments, segmented radial flange may include no greater than 51 flange segments, such as no greater than 46 flange segments, or even no greater than 41 flange segments. Moreover, the segmented radial flange can include a number of flange segments in a range of any of the above minimum or maximum values, such as 1 to 51 flange segments, 2 to 46 flange segments, or even 3 to 41 flange segments.

The flange segments can be spaced apart as desired depending on the application. In certain embodiments, as illustrated in FIG. 1, the flange segments 32 can be spaced apart equally along the segmented radial flange, where the all flange segments would have the same circumferential width. In other embodiments, although not illustrated, the flange segments can be spaced apart unequally throughout the flange, where not all flange segments would have the same circumferential width.

Depending on the desired application, the flange segments can extend outwardly (or in an outward direction) or inwardly (or in an inward direction) relative to the central axis A of the bearing component. As used herein, the terms "outwardly" or "outward direction" refer to extending from the sidewall away from the central axis A of the bearing component. For example, FIG. 1 provides an illustration of flange segments 32 extending radially outwardly, or in an outward direction, from the sidewall 20.

As used herein, the terms "inwardly" or "inward direction" refer to extending from the sidewall toward the central axis A of the bearing component. FIG. 4 provides an illustration of flange segments 132 extending radially inwardly, or in an inward direction, from the sidewall 20. In particular, FIG. 4 includes an illustration of an example bearing component 110 according to a further embodiment according to this disclosure. The bearing component 110 can include the sidewall 20 having a central axis A as described above, a segmented radial flange 130 extending from the sidewall 20, and a split feature 140 extending from between segments 132 of the flange 130 and into the sidewall 20. As stated previously, the bearing component 110 can include a segmented radial flange 130 having flange segments 132 that, unlike the flange segments 32 of bearing component 10, extend radially inwardly relative to the central axis A. It is to be understood that the embodiment illustrated in FIG. 4 is an illustrative embodiment. All of the items illustrated are not required, and any number of additional items, or fewer items, or different arrangement of items than shown is within the scope of the present disclosure.

The angle at which the flange segments extend from the sidewall 20, whether extending inwardly 132 or outwardly 32, can be adapted depending on the desired application. In certain embodiments, the flange segments can extend from the sidewall at an angle of at least 45°, such as at least 50°, at least 55°, or even at least 80°. In further embodiments, the flange segments can extend from the sidewall at an angle of no greater than 130°, such as no greater than 125°, or even no greater than 120°. Moreover, the flange segments can extend from the sidewall at an angle in a range of any of the above minimum or maximum values, such as 45 to 130°, 50 to 125°, or even 80 to 120°.

Each flange segment (32, 132) can have an axial thickness $AT_F$ defined as the distance between an outer surface of the flange segment and the inner surface of the flange segment, as illustrated in FIG. 2. The term "outer surface" used in association with the axial thickness of a flange segment refers to a surface of the flange segment nearest the axial end of the generally annular sidewall. For example, the outer surface of a flange segment can be contiguous with an axial end of the generally annular sidewall. The term "inner surface" used in association with the axial thickness of a flange segment refers to a surface of the flange segment opposite the outer surface. For example, the inner surface of the flange segment can be contiguous with the generally annular sidewall an axial distance (e.g. an axial distance equal to the axial thickness $AT_F$) from the outer surface of the flange segment.

In certain embodiments, the axial thickness $AT_F$ can include any of the values or ranges described above for the radial thickness $RT_S$, as the flange segment and the sidewall can be a monolithic piece. In particular embodiments, as illustrated in FIG. 3, the flange segment can have an axial thickness $AT_F$ that is substantially the same as the radial thickness $RT_S$. In alternative embodiments, although not illustrated, the flange segment can have an axial thickness $AT_F$ that is substantially greater than or less than the radial thickness $RT_S$. Moreover, each flange segment can have the same or varying axial thicknesses $AT_F$.

Each flange segment (32, 132) can have a radial length $RL_F$ measured from an intersection with the sidewall 20 to the end of the flange segment opposite the sidewall 20. In certain embodiments, a flange segment can have an $RL_F$ of at least 1 mm, such as at least 2 mm, or even at least 3 mm. In further embodiments, a flange segment can have an $RL_F$ of no greater than 100 mm, such as no greater than 75 mm, or even no greater than 50 mm. Moreover, a flange segment can have an $RL_F$ in a range of any of the above minimum and maximum values, such as 1 to 100 mm, 2 to 75 mm, or even 3 to 50 mm. In particular embodiments, each flange segment (32, 132) can have substantially the same $RL_F$.

The length of a flange segment can also be described in relation to the inner diameter of the generally annular sidewall, $ID_S$, such as in the ratio $RL_F:ID_S$ where $RL_F$ is divided by $ID_S$. In certain embodiments, the ratio $RL_F:ID_S$ can be at least 2:1, such as at least 1.8:1, or even at least 1.5:1. In further embodiments, the ratio $RL_F:ID_S$ may be no greater than 1:1, no greater than 1:2, or no greater than 1:3. Moreover, the ratio $RL_F:ID_S$ can be in a range of any of the above minimum or maximum values, such as 2:1 to 1:1, 1.8:1 to 1:2, and 1.5:1 to 1:3.

As stated previously, the bearing component can include a split feature 40 or 140 extending between segments 32 or 132 of the segmented radial flange and into the sidewall 20. In certain embodiments, the split feature 40 or 140 can include a flange split 42 or 142 that is contiguous with a sidewall split 44 or 144, as illustrated in FIGS. 4 and 5.

In conventional flanged bearing components, cracks can form in the sidewall of the bearing component, particularly when the length of the flange exceeds the inner diameter of the flanged bearing, and especially when exceeding the inner diameter by a factor of at least 1.5. However, embodiments of the bearing component described herein can be free or substantially free of cracking, even at a large ratio of flange length to inner diameter.

In certain embodiments, the split feature described herein can assist in substantially eliminating the formation of such cracks in the sidewall. In particular embodiments, as stated previously, the split feature can include a flange split disposed between flange segments that is contiguous with a sidewall split extending an axial distance into the generally annular sidewall. The structure of the split feature can contribute to eliminating the formation of cracks in the generally annular sidewall. In more particular embodiments, the split feature can relieve the stress of forming flange segments in a metal substrate layer.

Figure 5:
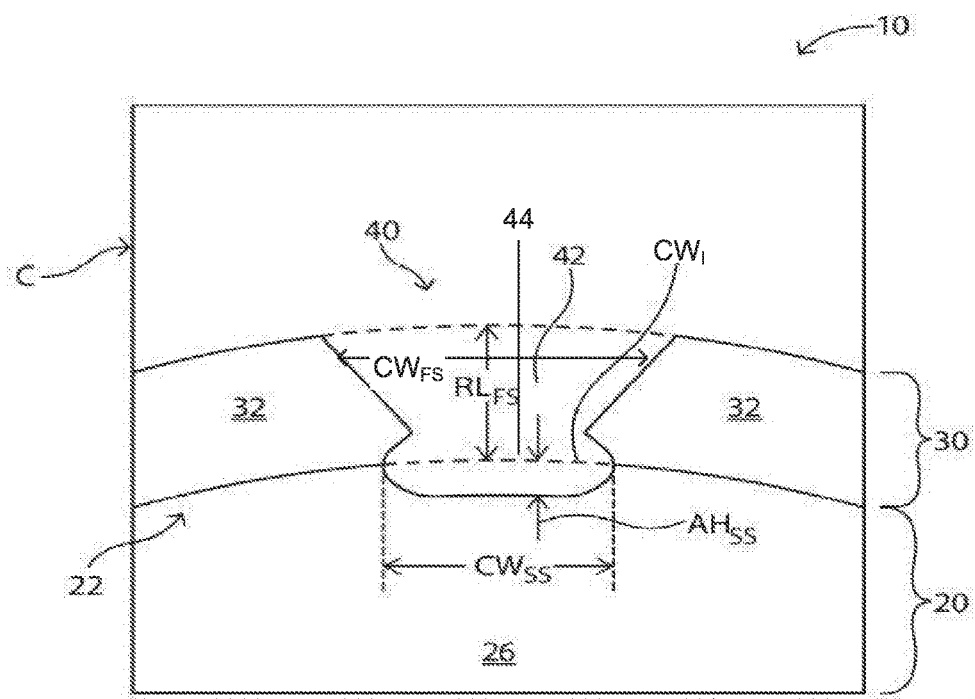
FIG. 5 includes an illustration of a close-up view of a portion of the bearing component illustrated in FIG. 1.

FIG. 5 includes an illustration of a close-up view of Box C in FIG. 1. As illustrated in FIGS. 1 and 5, the first axial end 22 can define a discontinuous ring interrupted by each of the split features 40 at an intersection I (see FIG. 5) of the flange split 42 and the sidewall split 44. In certain embodiments, the sidewall split 44 can extend from the intersection I an axial distance into the sidewall 20 such that the sidewall 20 can define the sidewall split 44.

The axial distance the sidewall split extends into the sidewall represents the axial height of the sidewall split, $AH_{SS}$. In certain embodiments, the sidewall split has an axial height, $AH_{SS}$, of no greater than 75% a total axial height, $AH_S$, of the sidewall, such as no greater than 60%, no greater than 45%, no greater than 30%, no greater than 25%, no greater than 20%, no greater than 15%, or even no greater than 10%.

As illustrated in FIG. 5, the sidewall split 44 can have a circumferential width $CW_{SS}$ that is equal to the circumferential width, $CW_I$, of the split feature 40 at the intersection I. In other embodiments, not illustrated, the sidewall split can have a maximum circumferential width $CW_{SS}$ that is greater than the circumferential width $CW_I$. In certain embodiments, the sidewall split can have a circumferential width $CW_{SS}$ of at least 1 mm, such as at least 2 mm, or even at least 3 mm. In further embodiments, the sidewall split can have a circumferential width $CW_{SS}$ of no greater than 50 mm, such as no greater than 45 mm, or even no greater than 40 mm. Moreover, the sidewall split can have a circumferential width $CW_{SS}$ in a range of any of the above maximum and minimum values, such as 1 to 50 mm, such as 2 to 45 mm, or even 3 to 40 mm.

In certain embodiments, as illustrated in FIG. 5, the sidewall split 44 can terminate in a rounded feature having an ellipsoidal shape, such as for example, an oval shape or even an elliptical shape. In alternative embodiments, not pictured, the sidewall split can terminate in a feature having a shape with two sides having an angle of at least 60° relative to each other, or a shape of a polygon with at least three sides.

The flange split can be defined by opposing edges of adjacent flange segments. The flange segment edges can contact each other, overlap each other, form a puzzle shape, or not contact each other. In particular embodiments, as illustrated in FIG. 4, the flange split 142 can include edges that are parallel to each other. In other particular embodiments, as illustrated in FIG. 1, the flange split 42 can include edges that are not parallel to each other. The opposing edges of the adjacent flange segments can define a V-shaped notch. The shape of the flange split can be determined by the shape of the gap of the bearing preassembly, which will be discussed later in the specification.

In certain embodiments, the angle of one of the opposing edges relative to the other can be no greater than 120°, such as no greater than 115°, or even no greater than 110°. In further embodiments, the angle of one of the opposing edges relative to the other can be at least 0°, such as at least 5°, or even at least 10°. Moreover, the angle of one of the opposing edges relative to the other can be in a range of any of the above minimum and maximum values, such as 0 to 120°, such as 5 to 115°, or even 10 to 110°.

The flange split can have a radial length $RL_{FS}$ measured from an end of the flange split to the intersection I of the flange split 42 or 142 and the sidewall split 44 or 144 and can include any of the values described above for the radial length of the flange segment $RL_E$.

The flange split can have a circumferential width $CW_{FS}$ measured from one of the adjacent flange segment edges to the opposite edge of another adjacent flange segment. In certain embodiments, the circumferential width $CW_{FS}$ can be substantially constant along the radial length $RL_{FS}$, such as illustrated in FIG. 4 where the adjacent edges of the flange segments are substantially parallel. In other embodiments, as illustrated in FIG. 1, the circumferential width $CW_{FS}$ can increase along the radial length $RL_{FS}$ in a radial direction toward the end of the flange split opposite the intersection.

As stated previously, the split feature can include a circumferential width, $CW_I$, at the intersection of the flange split and the sidewall split. In certain embodiments, the minimum circumferential width $CW_{FS}$ can be less than the circumferential width $CW_I$. In further embodiments, the minimum circumferential width $CW_{FS}$ can be equal to the circumferential width $CW_I$.

Figure 6:
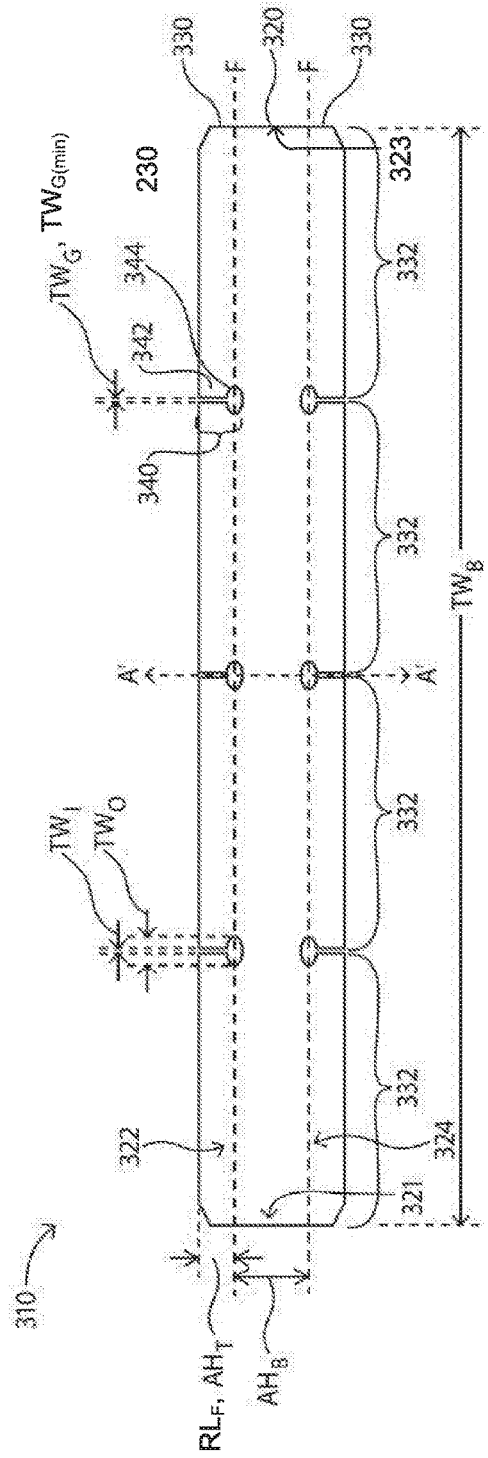
FIG. 6 includes an illustration of an example bearing component preassembly according to certain embodiments of this disclosure.

As stated previously, a bearing component preassembly can be shaped into the bearing component. Thus, the bearing component preassembly will be described below in terms corresponding to the shaped bearing component described above. FIG. 6 includes an illustration of an example bearing component preassembly 310 according to certain embodiments of this disclosure. The bearing component preassembly 310 can have a body 320 (corresponding to the sidewall 20), a segmented tab 330 (corresponding to the segmented flange 30, 130) extending from the body 320, and a gap feature 340 (corresponding to the split feature 40, 140) extending between segments of the tabe 330 and into the body 320.

The body 320, as discussed above, can correspond to the sidewall 20 of the bearing component or, in other words, can be shaped into the sidewall 20. Thus, the body 320 can have the dimensions necessary to achieve the characteristics of the sidewall 20 described above. That being said, certain aspects of the body will be described below.

In certain embodiments, the body can have a generally polygonal shape having at least four ends including first and second ends in an axial direction, and first and second ends in a transverse direction. The term "end" used in association with an end of the body refers to an actual terminating end of the bearing component preassembly if a tab does not extend from the end. However, if a tab extends from the end, the term "end" refers to the intersection between the body and the tab, that is a delineation where the body ends and the tab begins. For example, as illustrated in FIG. 6, the bearing component preassembly includes a tab on both the first and second axial ends and the fold line F represents the intersection with the tab and the axial end. Thus, the fold lines F define the ends of the body in the axial direction.

The term "axial direction" when used in association with a bearing component preassembly refers to the direction of the central axis A' of the body, as illustrated in FIG. 6, which corresponds to the central axis A of the bearing component. Further, the term "transverse direction" when used in association with bearing component preassembly refers to a direction perpendicular to the axial direction that extends across a major surface of the bearing component preassembly.

The body can have an axial height $AH_B$ measured from the first axial end 322 to the second axial end 324. As the body can correspond to the sidewall, the axial height $AH_B$ can correspond to the axial height of the sidewall $AH_S$. Thus, in certain embodiments, the axial height of the body $AH_B$ can include any of the values or ranges discussed above with respect to the axial height of the sidewall $AH_S$.

The body 320 can have a thickness $T_B$ measured from a first major surface to an opposite second major surface. As the body can correspond to the sidewall, the thickness of the body $T_B$ can correspond to the radial thickness of the sidewall $RT_S$ described earlier in this disclosure. For example, the thickness $T_B$ can include any of the values or ranges described above for the radial thickness $RT_S$.

The body can have a transverse width $TW_B$ measured from the first transverse end to the second transverse end. In certain embodiments, the transverse width $TW_B$ can be at least 75 mm, such as at least 95 mm, or even at least 110 mm. In further embodiments, the transverse width $TW_B$ may be no greater than 1000 mm, such as no greater than 850 mm, or even no greater than 750 mm. Moreover, the transverse width $TW_B$ can be in a range of any of the above minimum or maximum values, such as 75 to 1000 mm, 95 to 850 mm, or even 110 to 750 mm.

In certain embodiments, the body can have a transverse value $TV_B$ equal to the transverse width $TW_B$ of the body divided by π (and corresponding to the inner diameter of the eventual generally annular sidewall of the bearing component that may be shaped from the bearing component preassembly). Thus, in certain embodiments, the transverse value $TV_B$ can include any of the values or ranges discussed above with respect to the inner diameter $ID_S$ of the generally annular sidewall.

As illustrated in FIG. 6, the body 320 can include a first transverse end 321 and a second transverse end 323. The first and second transverse ends can correspond to the first and second circumferential ends of the bearing component and can be adapted to together define an axial split, including an axial split as described above, when the body is shaped into the generally annular sidewall. For example, the first and second transverse ends can be adapted to be spaced apart, interlocked, or welded together.

In certain embodiments, the first and second transverse ends can be parallel to each other, such as adapted to define a linear axial split described earlier. In other embodiments, the first and second transverse ends can be non-parallel to each other, such as adapted to define a non-linear axial split described earlier. In particular embodiments, the first transverse end can include a transverse protrusion and the second transverse end can include a transverse indent, so as to be adapted to be shaped into the non-linear axial split illustrated in FIG. 4. Thus, the indent can be adapted to receive the protrusion when the body is shaped into the generally annular sidewall.

The segmented tab 330, as discussed above, can correspond to the segmented radial flange 30, 130 of the bearing component or, in other words, can be shaped into the segmented radial flange 30, 130. Thus, the segmented tab 330 can have the dimensions necessary to achieve the characteristics of the segmented radial flange 30, 130 described above. That being said, certain aspects of the segmented tab will be described below.

As illustrated in FIG. 6, the segmented tab can include tab segments 332 extending from the body in an axial direction, such as from the first end 322, the second end 324, or both the first and second ends 322, 324 in an axial direction.

The segmented tab can include a plurality of tab segments sufficient to achieve the number of flange segments desired for the bearing component. Thus, in certain embodiments, the segmented tab can include any of the values or ranges discussed above with respect to the number of flange segments in a segmented flange.

Further, as discussed above with respect to the flange segments, the tab segments can be spaced apart as desired depending on the application. In certain embodiments, as illustrated in FIG. 6, the tab segments can be spaced apart equally along the tab. In other embodiments, although not illustrated, the tab segments can be spaced apart unequally along the tab, in other words not have the same transverse width.

Each of the tab segments can have a thickness $T_T$ measured from a first major surface to an opposite second major surface. In certain embodiments, the thickness $T_T$ can be equal to the thickness $T_B$ of the body, as the tab and the body can be a single monolithic piece. In particular embodiments, the thickness of the bearing component preassembly can be constant from the first axial end to the second axial end of the body and including any tab extending from either axial end.

In certain embodiments, each of the tab segments can have an axial height $AH_T$, measured from the intersection with the body to the end of the tab segment opposite the body. As the segmented tab is adapted to be shaped into the segmented flange, the axial height $AH_T$ can correspond to the radial length $RL_F$ of the flange segments of the eventual radial flange that may be made from the bearing component preassembly. Thus, in certain embodiments, the axial height segmented tab $AH_T$ can include any of the values or ranges discussed above with respect to the radial length of the segmented flainge $RL_F$.

The relationship of the axial height $AH_T$ and the transverse value $TV_B$ can be expressed as the ratio $AH_T:TV_B$. The ratio $AH_T:TV_B$ can correspond to the ratio $RL_F:ID_S$ of the bearing component that may eventually be made from the bearing component preassembly. Thus, in certain embodiments, the ratio $AH_T:TV_B$ can include any of the values or ranges discussed above with respect to the ratio $RL_F:ID_S$.

Figure 8:
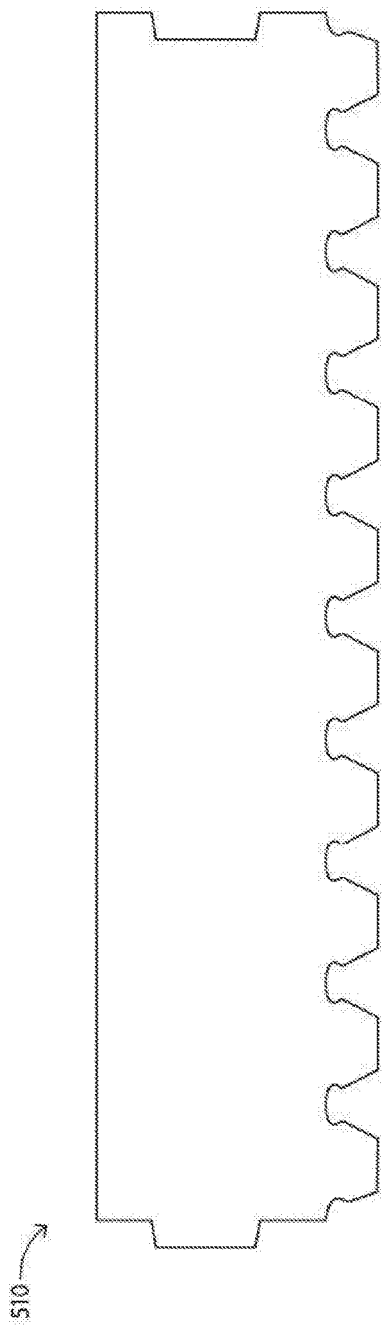
FIG. 8 includes an illustration of yet another example bearing component preassembly according to certain embodiments of this disclosure.
Figure 9:
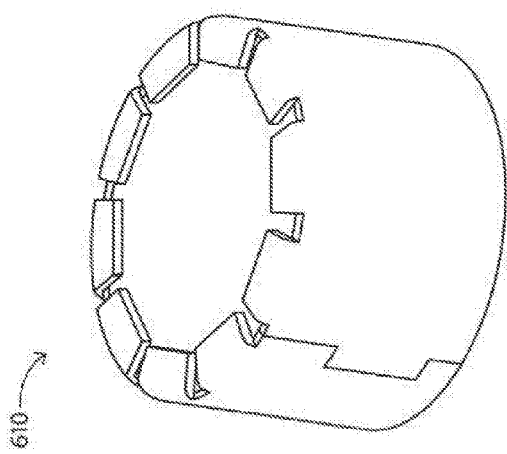
FIG. 9 includes an illustration of yet another example bearing component according to certain embodiments of this disclosure.

In certain embodiments, at least two tab segments can extend from both the first end and the second end of the body, as illustrated in FIG. 8. In alternative embodiments, the body can include only one axial end from which tab segments extend.

The gap feature 340, as discussed above, can correspond to the split feature 40, 140 of the bearing component or, in other words, can be shaped into the split feature 40, 140. Thus, the gap feature 340 can have the dimensions necessary to achieve the characteristics of the split feature 40, 140 described above. That being said, certain aspects of the gap feature will be described below.

As illustrated in FIG. 6, the tab segments 332 can be separated by a gap feature 340. The gap feature can include a gap 342 and an opening 344 contiguous with the gap 342. Generally speaking, the gap 342 defines a channel extending along the tab segments in the axial direction toward the body. The gap 342 has a transverse width $TW_G$ that can remain constant or decrease as it approaches the body, leading into and intersecting with a widened portion referred to as the opening 344. In other words, the transverse width of the gap feature increases after the intersection moving into the opening. The opening represents a widened portion in the sense that the opening can have a transverse width $TW_O$ that is greater than a transverse width $TW_I$ of an intersection between the gap and the opening. In certain embodiments, the transverse width of the intersection $TW_I$ can be the minimum transverse width of the gap, $TW_{G(min)}$. However, it is possible that the transverse width of the gap can increase as it approaches the opening, so long as the transverse width of the intersection $TW_I$ is less than or equal to a transverse width of the opening $TW_O$.

In certain embodiments, the bearing component preassembly can include at least 2 gap features or even at least 3 gap features. In further embodiments, the bearing component preassembly can include no greater than 50 gap features, no greater than 45 gap features, or no greater than 40 gap features. Moreover, the bearing component preassembly can include a number of gap features in a range of any of the above minimum or maximum values, such as 1 to 50, 2 to 45, or 3 to 40. In certain embodiments, the number of split features in a bearing component can be greater than the number of gap features in a bearing component preassembly to account for the split feature formed by the joining of the transverse ends.

The gap 342 of the gap feature 340 can generally correspond to the flange split 42, 142 described earlier in the application. However, depending on how the tab is bent to form the flange, a portion of the gap my form a portion of the sidewall split. That being said, at least a portion of the gap 342 can be defined by opposing edges of adjacent tab segments 332 and the opposing edges of the adjacent tab segments generally do not contact each other.

In certain embodiments, the opposing edges of the adjacent tab segments can be parallel with each other, as illustrated in FIG. 6. In such embodiments, the shape of the gap 342 can be parallel so that the flange segments can extend radially outwardly when the bearing component preassembly is shaped into a bearing component.

Figure 7:
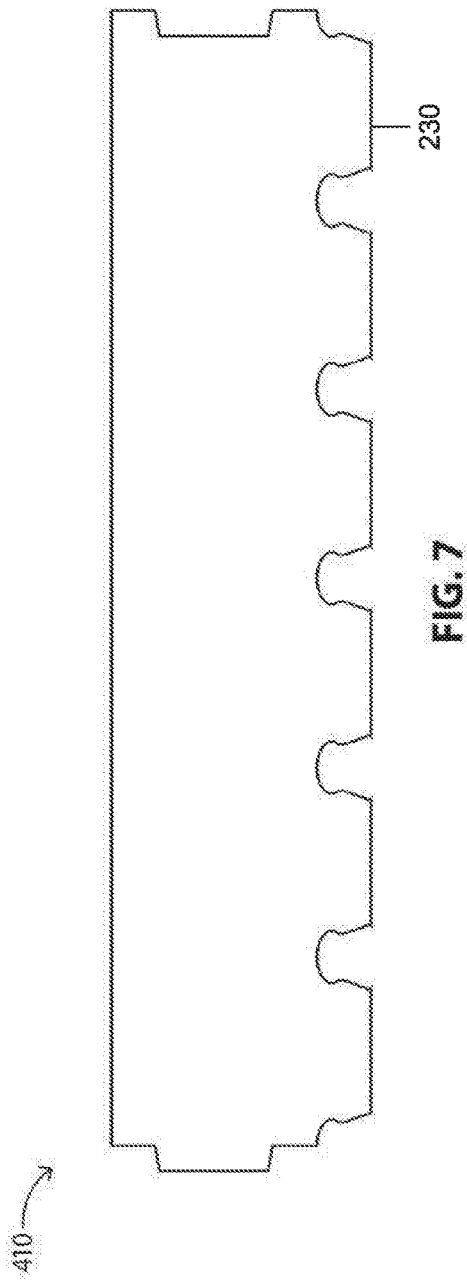
FIG. 7 includes an illustration of another example bearing component preassembly according to certain embodiments of this disclosure.

In other embodiments, the opposing edges of the adjacent tab segments are not parallel to each other, as illustrated in FIGS. 7 and 8. FIGS. 7 and 8 include illustrations of example bearing component preassemblies 410 and 510 according to other embodiments according to this disclosure. For example, as illustrated in FIGS. 7 and 8, the shape of the gap defined by the opposing edges of the adjacent tab segments is a V-shaped notch. In particular embodiments, the gap can be a V-shaped notch so that the radial flange can extend radially inwardly when the bearing component preassembly is shaped into a bearing component.

In certain embodiments, the angle of one of the opposing edges relative to the other can be no greater than 120°, such as no greater than 115°, or even no greater than 110°. In further embodiments, the angle of one of the opposing edges relative to the other can be at least 0°, such as at least 5°, or even at least 10°. Moreover, the angle of one of the opposing edges relative to the other can be in a range of any of the above minimum and maximum values, such as 0 to 120°, such as 5 to 115°, or even 10 to 110°.

The opening 344 lies at what can be considered the base of the gap feature 340 and can be contiguous with the gap 342. The opening 344 can generally correspond to the sidewall split 44, 144 described earlier in the application. However, depending on how the tab segment is bent to form the flange segment, a portion of the opening 344 my form a portion of the flange split 44, 144. For example, the opening can extend from a transverse fold line F into the body an axial distance. That being said, at least a portion of the opening can be defined by the body.

In certain embodiments, the opening can be arcuate. In particular embodiments, the opening can terminate in an ellipsoidal shape, such as for example, an oval shape or even an elliptical shape, as illustrated in FIGS. 6-8. In more particular embodiments, the opening can be elliptic. The major axis of the oval or elliptic shape can be in the transverse direction. In alternative embodiments, although not illustrated, the opening can have a polygonal shape, such as a shape with at least two sides at angle of at least 60° with respect to each other, or a shape with at least three sides.

In certain embodiments, the opening can have a transverse width $TW_O$ of at least 1 mm, such as at least 2 mm, or even at least 3 mm. In further embodiments, the opening can have a transverse width $TW_O$ of no greater than 50 mm, such as no greater than 45 mm, or even no greater than 40 mm. Moreover, the opening can have a transverse width $TW_O$ in a range of any of the above minimum and maximum values, such as 1 to 50 mm, 2 to 45 mm, or even 3 to 40 mm.

In certain embodiments, the bearing component preassembly can include the same materials as discussed above with respect to the bearing component. In particular embodiments, the bearing component preassembly can include a single layer, such as a substrate layer. In further embodiments, the bearing component can include multiple layers such as a composite comprising a metal substrate layer and a low-friction layer. The materials for the substrate layer and the low-friction layer can include the same materials described above for the bearing component.

Generally speaking, the bearing component preassembly can be structured such that it can be shaped into a bearing component according to certain embodiments described herein. In particular embodiments, variations in the shape of different embodiments of the bearing component preassembly can arise in relation to the desired structure of the bearing. For example, the gap feature of an embodiment of the bearing component preassembly where the tab segments are adapted to be shaped into flange segments that extend radially outwardly from the sidewall (see FIGS. 1 and 6) will have a different shape than the gap feature of an embodiment of the bearing component preassembly where the tab segments are adapted to be shaped into flange segments that extend radially inwardly (see FIGS. 4 and 7-9).

In an exemplary method, a substrate can be formed into a strip and the strip cut to include a body and at least one tab extending from the body. The body can be shaped to form the generally annular sidewall and the tab can be shaped for form the radial flange.

The method can be initiated by providing a composite strip corresponding to embodiments of the bearing component preassembly. The composite strip can cut from a larger piece of composite material or otherwise formed as a strip to include a substantially rigid substrate layer and an overlying low-friction layer. Cutting of the composite strip can be accomplished using manual or automatic devices. The composite strip can be formed as a strip having a major surface, a first and second axial end, and a first and second transverse end. In certain embodiments, the longest dimension of the substrate is the distance between the first and second transverse ends.

Once formed, the composite strip can be machine or manually fed into a channel having dimensions substantially similar to the dimensions of the composite strip such that at least a portion of the composite strip is secured in the channel during forming. After the composite strip is engaged in the channel, the composite strip can engage a mandrel, such as by contacting a portion of the strip to the surface of the mandrel. In certain embodiments, engaging the mandrel can further include securing a portion of the composite strip against the mandrel.

The mandrel can have a selected geometry and contour substantially similar to the desired geometry and contour of the final shaped bearing component. Generally, the mandrel can have a symmetrical shape, such as a circle, or the like. In certain embodiments, the mandrel can have a circular contour for forming a bearing component having a generally annular sidewall, whereby the circumference of the mandrel substantially defines the inner circumference of the shaped composite piece. Generally, the size of the mandrel can be altered depending upon the desired size of the shaped bearing component.

After engaging the composite strip with the mandrel, the composite strip can be shaped around the contour of the mandrel. For example, a suitable technique for forming the composite strip around the mandrel includes rolling the major surface of the composite strip under a sufficient force to guide the composite strip around the mandrel. According to one embodiment, the rolling force is at least about 2.0 kN, such at least about 4.5 kN, or at least about 10 kN. In further embodiments, the rolling force may be not greater than about 50 kN.

The shaping process can also be aided by gripping the composite strip and guiding the composite strip around the mandrel while rolling the major surface of the composite strip. The process can utilize one or a plurality of gripping mechanisms, such as jaws or pincers, displaced around the mandrel for engaging the composite strip and maintaining sufficient force to aid the shaping process. In a particular embodiment, the jaws form the composite strip along the shape of the mandrel while rollers move over the major surface of the composite strip. After forming half of the composite shape, another set of jaws can grip the ends of the composite strip and guide the composite strip along the remainder of the mandrel to finish the shaping process while the major surface of the composite material is rolled under a sufficient force. Upon completion of the shaping process, the composite strip can be removed from around the shape of the mandrel.

Once the generally annular sidewall is formed, the tabs of the bearing component preassembly can be bent so as to extend radially inwardly or outwardly depending on the desired construction of the bearing component. In alternative embodiments, the tab or tabs can be shaped into the radial flange or flanges prior to forming the generally annular sidewall from the body. In further embodiments, once the generally annular sidewall is shaped, the circumferential ends of the generally annular sidewall can form the axial split. If desired, the axial split can be joined or welded to secure the shape of the sidewall.

It is a particular advantage of certain embodiments of the method described herein that the bearing component preassembly can be formed into embodiments of the bearing component without forming cracks in the sidewall, particularly when forming the tab or tabs into the radial flange or flanges.

Further, the bearing component described herein can have unexpectedly improved performance due to the absence of cracks in the sidewall. In certain embodiments, the bearing component can have improved durability. In further embodiments, the bearing component can have improved sliding properties. The improved performance, durability, and sliding properties can be employed in a variety of applications, such as in a subcomponent for a motor vehicle powertrain.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

Embodiment 1

A bearing component preassembly comprising:
a body including first and second opposite ends in an axial direction; and
a tab including at least two tab segments extending from one of the first and second ends of the body in an axial direction; and
a gap feature including an opening and a gap extending in an axial direction toward the opening,
wherein the at least two tab segments are separated by the gap and the opening has a transverse width $TW_O$ that is greater than a transverse width $TW_I$ of an intersection between the gap and the opening.

Embodiment 2

A bearing component comprising:
the bearing component preassembly of embodiment 1 shaped so as to include:
a generally annular sidewall shaped from the body so as to have a central axis and define a first and a second opposite ends in an axial direction; and
a radial flange shaped from the tab, which is bent so as to extend in a radial direction from one of the first and second ends of the generally annular sidewall.

Embodiment 3

A method of making a bearing component, comprising:
providing the bearing component preassembly of embodiment 1; and
shaping the bearing component preassembly to form the bearing component of embodiment 2.

Embodiment 4

The bearing component preassembly, bearing component, or method of any one of the preceding embodiments, wherein at least a portion of the gap is defined by opposing edges of adjacent tab segments.

Embodiment 5

The bearing component preassembly, bearing component, or method of embodiment 4, wherein the opposing edges of the adjacent flange segments do not contact each other.

Embodiment 6

The bearing component preassembly, bearing component, or method of any one of embodiments 4 and 5, wherein the opposing edges of the adjacent tab segments are parallel to each other.

Embodiment 7

The bearing component preassembly, bearing component, or method of any one of embodiments 4 and 5, wherein the opposing edges of the adjacent tab segments are not parallel to each other.

Embodiment 8

The bearing component preassembly, bearing component, or method of any one of embodiments 4-7, wherein the gap defined by the opposing edges of the adjacent tab segments is a V-shaped notch.

Embodiment 9

The bearing component preassembly, bearing component, or method of any one of embodiments 4-8, wherein the angle of one of the opposing edges relative to the other is no greater than 120°, no greater than 115°, or no greater than 110°.

Embodiment 10

The bearing component preassembly, bearing component, or method of any one of embodiments 4-9, wherein the angle of one of the opposing edges relative to the other is at least 0°, at least 5°, or at least 10°.

Embodiment 11

The bearing component preassembly, bearing component, or method of any one of embodiments 4-10, wherein the angle of one of the opposing edges relative to the other is in a range of 0 to 120°, 5 to 115°, or 10 to 110°.

Embodiment 12

The bearing component preassembly, bearing component, or method of any one of the preceding embodiments, wherein at least two tab segments extend from both of the first and second ends of the body.

Embodiment 13

The bearing component preassembly, bearing component, or method of any one of the preceding embodiments, wherein the opening is arcuate, oval, or elliptic.

Embodiment 14

The bearing component preassembly, bearing component, or method of any one of embodiments 1-12, wherein the opening has a shape with at least two sides at angle of at least 60° with respect to each other, or a shape with at least three sides.

Embodiment 15

The bearing component preassembly, bearing component, or method of any one of the preceding embodiments, wherein the opening has a transverse width $TW_O$ of at least 1 mm, at least 2 mm, or at least 3 mm.

Embodiment 16

The bearing component preassembly, bearing component, or method of any one of the preceding embodiments, wherein the opening has a transverse width $TW_O$ of no greater than 50 mm, no greater than 45 mm, or no greater than 40 mm.

Embodiment 17

The bearing component preassembly, bearing component, or method of any one of the preceding embodiments, wherein the opening has a transverse width $TW_O$ in a range of 1 to 50 mm, 2 to 45 mm, or 3 to 40 mm.

Embodiment 18

The bearing component, bearing component preassembly, or method of any one of the preceding embodiments, wherein the bearing component preassembly includes at least 2 gap features or at least 3 gap features.

Embodiment 19

The bearing component, bearing component preassembly, or method of any one of the preceding embodiments, wherein the bearing component preassembly includes no greater than 50 gap features, no greater than 45 gap features, or no greater than 40 gap features.

Embodiment 20

The bearing component, bearing component preassembly, or method of any one of the preceding embodiments, wherein the bearing component preassembly includes a number of gap features in a range of 1 to 50, 2 to 45, or 3 to 40.

Embodiment 21

The bearing component, bearing component preassembly, or method of any one of the preceding embodiments, wherein
the tab segments each have an axial height $AH_T$,
the body has a transverse value $TV_B$ equal to the transverse width $TW_B$ of the body divided by $\pi$, and
the ratio $AH_T:TV_B$ is at least 2:1, at least 1.8:1, or at least 1.5:1.

Embodiment 22

The bearing component, bearing component preassembly, or method of embodiment 25, wherein the ratio $AH_T:TV_B$ is no greater than 1:1, no greater than 1:2, or no greater than 1:3.

Embodiment 23

The bearing component, bearing component preassembly, or method of any one of embodiments 25 and 26, wherein the ratio $AH_T:TV_B$ is in a range of 2:1 to 1:1, 1.8:1 to 1:2, and 1.5:1 to 1:3.

Embodiment 24

The bearing component, bearing component preassembly, or method of any one of the preceding embodiments, wherein the tab segments each have an axial height $AH_T$ of at least 1 mm, at least 2 mm, or at least 3 mm.

Embodiment 25

The bearing component, bearing component preassembly, or method of any one of the preceding embodiments, wherein the tab segments each have an axial height $AH_T$ of no greater than 100 mm, no greater than 75 mm, or no greater than 50 mm.

Embodiment 26

The bearing component, bearing component preassembly, or method of any one of the preceding embodiments, wherein the tab segments each have an axial height $AH_T$ in a range of 1 to 100 mm, as 2 to 75 mm, or 3 to 50 mm.

Embodiment 27

The bearing component, bearing component preassembly, or method of any one of the preceding embodiments, wherein the body has a transverse value $TV_B$, equal to the transverse width $TW_B$ of the body divided by $\pi$, of at least 25 mm, at least 30 mm, or at least 35 mm.

Embodiment 28

The bearing component, bearing component preassembly, or method of any one of the preceding embodiments, wherein the body has a transverse value $TV_B$, equal to the transverse width $TW_B$ of the body divided by $\pi$, of no greater than 300 mm, no greater than 275 mm, or no greater than 250 mm.

Embodiment 29

The bearing component, bearing component preassembly, or method of any one of the preceding embodiments, wherein the body has a transverse value $TV_B$, equal to the transverse width $TW_B$ of the body divided by $\pi$, in a range of 25 to 300 mm, 30 to 275 mm, or 35 to 250 mm.

Embodiment 30

The bearing component, bearing component preassembly, or method of any one of the preceding embodiments, wherein the bearing component preassembly includes at least 3 tab segments or at least 4 tab segments.

Embodiment 31

The bearing component, bearing component preassembly, or method of any one of the preceding embodiments, wherein the bearing component preassembly includes no greater than 51 tab segments, no greater than 46 tab segments, or no greater than 41 tab segments.

Embodiment 32

The bearing component, bearing component preassembly, or method of any one of the preceding embodiments, wherein the bearing component preassembly includes a number of tab segments in range of 1 to 51, 2 to 46, or 3 to 41.

Embodiment 33

The bearing component, bearing component preassembly, or method of any one of the preceding embodiments, wherein the tab segments are spaced apart equally along the first or second ends of the bearing component preassembly.

Embodiment 34

The bearing component, bearing component preassembly, or method of any one of the preceding embodiments, wherein the tab segments are not spaced equally along the first or second axial end of the bearing component preassembly.

Embodiment 35

The bearing component, bearing component preassembly, or method of any one of the preceding embodiments, wherein the axial height $AH_B$ of the body from the first axial end to the second axial end is at least 7 mm, at least 8 mm, or at least 9 mm.

Embodiment 36

The bearing component, bearing component preassembly, or method of any one of the preceding embodiments, wherein the axial height $AH_B$ of the body from the first axial end to the second axial end is no greater than 45 mm, no greater than 35 mm, or no greater than 30 mm.

Embodiment 37

The bearing component, bearing component preassembly, or method of any one of the preceding embodiments, wherein the axial height $AH_B$ of the body from the first axial end to the second axial end is in a range of 7 to 45 mm, 8 to 35 mm, or 9 to 30 mm.

Embodiment 38

The bearing component, bearing component preassembly, or method of any one of the preceding embodiments, wherein the bearing component preassembly includes a first transverse end and an opposite second transverse end together adapted to define an axial split when the body is shaped into the generally annular sidewall.

Embodiment 39

The bearing component, bearing component preassembly, or method of embodiment 38, wherein the first transverse end includes a transverse protrusion.

Embodiment 40

The bearing component, bearing component preassembly, or method of any one of embodiments 38 and 39, wherein the second transverse end includes a transverse indent.

Embodiment 41

The bearing component, bearing component preassembly, or method of any one of embodiments 38-40, wherein the indent is adapted to receive the protrusion when the body is shaped into the generally annular sidewall.

Embodiment 42

The bearing component, bearing component preassembly, or method of any one of embodiments 38-41, wherein the first and second transverse ends are adapted to be spaced apart, interlocked, or welded together when the body is shaped into the generally annular sidewall.

Embodiment 43

The bearing component, bearing component preassembly, or method of any one of the preceding embodiments, wherein the substrate layer includes a metal.

Embodiment 44

The bearing component, bearing component preassembly, or method of embodiment 43, wherein the metal comprises a steel, an aluminum, a bronze, a copper, a magnesium, a titanium, a nickel, a zinc, or any combination thereof.

Embodiment 45

The bearing component, bearing component preassembly, or method of any one of the preceding embodiments, wherein a low-friction layer is disposed adjacent to the substrate layer.

Embodiment 46

The bearing component, bearing component preassembly, or method of embodiment 44, wherein the low-friction layer includes a polymer.

Embodiment 47

The bearing component, bearing component preassembly, or method of embodiment 46, wherein the polymer includes a polyketone, polyaramid, a thermoplastic polyimide, a polyetherimide, a polyphenylene sulfide, a polyethersulfone, a polysulfone, a polyphenylene sulfone, a polyamideimide, ultra high molecular weight polyethylene, a thermoplastic fluoropolymer, a polyamide, a polybenzimidazole, or any combination thereof.

Embodiment 48

The bearing component, bearing component preassembly, or method of any one of the preceding embodiments, wherein the bearing component preassembly is shaped so as to form:
a generally annular sidewall having a central axis and defining a first and a second opposite ends in an axial direction, the sidewall comprising a metal substrate layer;
a radial flange comprising at least two adjacent flange segments extending from one of the first and second ends of the generally annular sidewall; and
at least one split feature, the split feature comprising:
a flange split defined by opposing edges of the adjacent flange segments, and
a sidewall split extending from the flange split an axial distance into the sidewall,
wherein the flange split and the sidewall split of each split feature are contiguous.

Embodiment 49

A bearing component comprising:
a generally annular sidewall having a central axis and defining a first and a second opposite ends in an axial direction, the sidewall comprising a metal substrate layer;
a radial flange comprising at least two adjacent flange segments extending from one of the first and second ends of the generally annular sidewall; and
at least one split feature, the split feature comprising:
a flange split defined by opposing edges of the adjacent flange segments, and
a sidewall split extending from the flange split an axial distance into the sidewall,
wherein the flange split and the sidewall split of each split feature are contiguous.

Embodiment 50

The bearing component, bearing component preassembly, or method of any one of embodiments 48 and 49, wherein the sidewall split has a circumferential width $CW_{SS}$ of at least 1 mm, at least 2 mm, or at least 3 mm.

Embodiment 51

The bearing component, bearing component preassembly, or method of any one of embodiments 48-50, wherein the sidewall split has a circumferential width $CW_{SS}$ of no greater than 50 mm, no greater than 45 mm, or no greater than 40 mm.

Embodiment 52

The bearing component, bearing component preassembly, or method of any one of embodiments 48-51, wherein the sidewall split has a circumferential width $CW_{SS}$ in a range of 1 to 50 mm, 2 to 45 mm, or 3 to 40 mm.

Embodiment 53

The bearing component, bearing component preassembly, or method of any one of embodiments 48-52, wherein the sidewall split has a maximum circumferential width $CW_{SS}$ that is greater than or equal to a circumferential width at an intersection of the flange split and the sidewall split $CW_T$.

Embodiment 54

The bearing component, bearing component preassembly, or method of any one of embodiments 48-53, wherein the sidewall split terminates in a rounded feature having an oval shape or an elliptical shape.

Embodiment 55

The bearing component, bearing component preassembly, or method of any one of embodiments 48-53, wherein the sidewall split terminates in a feature having a shape with two sides having an angle of at least 60° relative to each other, or a shape of a polygon with at least three sides.

Embodiment 56

The bearing component, bearing component preassembly, or method of any one of embodiments 48-55, wherein the sidewall split has an axial height, $AH_{SS}$, of no greater than 75% a total axial height, $AH_S$, of the sidewall, no greater than 60%, no greater than 45%, no greater than 30%, no greater than 25%, no greater than 20%, no greater than 15%, or no greater than 10%.

Embodiment 57

The bearing component, bearing component preassembly, or method of any one of embodiments 48-56, wherein the generally annular sidewall has a radial thickness $RT_S$ of at least 0.2 mm, at least 0.4 mm, at least 0.6 mm, or at least 0.8 mm.

Embodiment 58

The bearing component, bearing component preassembly, or method of any one of embodiments 48-57, wherein the generally annular sidewall has a radial thickness $RT_S$ of no greater than 10 mm, no greater than 8 mm, no greater than 6 mm, no greater than 4 mm, or no greater than 2 mm.

Embodiment 59

The bearing component, bearing component preassembly, or method of any one of embodiments 48-58, wherein the generally annular sidewall has a radial thickness $RT_S$ in a range of 0.2 to 10 mm, 0.4 to 8 mm, 0.6 to 6 mm, 0.8 to 4 mm, or 0.8 to 2 mm.

Embodiment 60

The bearing component, bearing component preassembly, or method of any one of embodiments 48-59, wherein the generally annular sidewall has an inner diameter $ID_S$ of at least 25 mm, at least 30 mm, or at least 35 mm.

Embodiment 61

The bearing component, bearing component preassembly, or method of any one of embodiments 48-60, wherein the generally annular sidewall has an inner diameter $ID_S$ of no greater than 300 mm, no greater than 275 mm, or no greater than 250 mm.

Embodiment 62

The bearing component, bearing component preassembly, or method of any one of embodiments 48-61, wherein the generally annular sidewall has an inner diameter $ID_S$ in a range of 25 to 300 mm, 30 to 275 mm, or 35 to 250 mm.

Embodiment 63

The bearing component, bearing component preassembly, or method of any one of embodiments 48-62, wherein the radial flange extends radially inwardly from the generally annular sidewall.

Embodiment 64

The bearing component, bearing component preassembly, or method of any one of embodiments 48-63, wherein the radial flange extends radially outwardly from the generally annular sidewall.

Embodiment 65

The bearing component, bearing component preassembly, or method of any one of embodiments 48-64, wherein the radial flange includes at least two adjacent flange segments and the split feature is defined by opposing edges of the adjacent flange segments.

Embodiment 66

The bearing component, bearing component preassembly, or method of embodiment 63, wherein the opposing edges of the adjacent flange segments do not contact each other.

Embodiment 67

The bearing component, bearing component preassembly, or method of embodiment 63, wherein the opposing edges of the adjacent flange segments directly contact each other.

Embodiment 68

The bearing component, bearing component preassembly, or method of embodiment 65, wherein the opposing edges of the adjacent flange segments overlap each other or form a puzzle shape.

Embodiment 69

The bearing component, bearing component preassembly, or method of any one of embodiments 65-68, wherein the opposing edges of the adjacent flange segments are parallel to each other.

Embodiment 70

The bearing component, bearing component preassembly, or method of any one of embodiments 65-68, wherein the opposing edges of the adjacent flange segments are not parallel to each other.

Embodiment 71

The bearing component, bearing component preassembly, or method of embodiment 70, wherein the opposing edges of the adjacent flange segments define a V-shaped notch.

Embodiment 72

The bearing component, bearing component preassembly, or method of embodiment 71, wherein the angle of one of the opposing edges relative to the other is no greater than 120°, no greater than 115°, or no greater than 110°.

Embodiment 73

The bearing component, bearing component preassembly, or method of any one of embodiments 71 and 72, wherein the angle of one of the opposing edges relative to the other is at least 0°, at least 5°, or at least 10°.

Embodiment 74

The bearing component, bearing component preassembly, or method of any one of embodiments 71-73, wherein the angle of one of the opposing edges relative to the other is in a range of 0 to 120°, 5 to 115°, or 10 to 110°.

Embodiment 75

The bearing component, bearing component preassembly, or method of any one of embodiments 48-74, wherein at least two flange segments extend from both of the first and second axial ends of the generally annular sidewall.

Embodiment 76

The bearing component, bearing component preassembly, or method of any one of embodiments 48-75, wherein the sidewall split is arcuate, oval, or elliptic.

Embodiment 77

The bearing component, bearing component preassembly, or method of any one of embodiments 48-76, wherein the sidewall split has a shape with at least two sides at angle of at least 60° with respect to each other, or a shape with at least three sides.

Embodiment 78

The bearing component, bearing component preassembly, or method of any one of embodiments 48-77, wherein the flange segments each have a radial length $RL_F$, the generally annular sidewall has an inner diameter $ID_S$, and the ratio $RL_F:ID_S$ is at least 2:1, at least 1.8:1, or at least 1.5:1.

Embodiment 79

The bearing component, bearing component preassembly, or method of embodiment 78, wherein the ratio $RL_F:ID_S$ is no greater than 1:1, no greater than 1:2, or no greater than 1:3.

Embodiment 80

The bearing component, bearing component preassembly, or method of any one of embodiments 78 and 79, wherein the ratio $RL_F:ID_S$ is in a range of 2:1 to 1:1, 1.8:1 to 1:2, and 1.5:1 to 1:3.

Embodiment 81

The bearing component, bearing component preassembly, or method of any one of embodiments 48-80, wherein the flange segments each have a radial length $RL_F$ of at least 1 mm, at least 2 mm, or at least 3 mm.

Embodiment 82

The bearing component, bearing component preassembly, or method of any one of embodiments 48-81, wherein the flange segments each have a radial length $RL_F$ of no greater than 100 mm, no greater than 75 mm, or no greater than 50 mm.

Embodiment 83

The bearing component, bearing component preassembly, or method of any one of embodiments 48-82, wherein the flange segments each have a radial length $RL_F$ in a range of 1 to 100 mm, 2 to 75 mm, or 3 to 50 mm.

Embodiment 84

The bearing component, bearing component preassembly, or method of any one of embodiments 48-83, wherein the bearing component includes at least 3 flange segments or at least 4 flange segments.

Embodiment 85

The bearing component, bearing component preassembly, or method of any one of embodiments 48-84, wherein the bearing component includes no greater than 51 flange segments, no greater than 46 flange segments, or no greater than 41 flange segments.

Embodiment 86

The bearing component, bearing component preassembly, or method of any one of embodiments 48-85, wherein the bearing component includes flange segments in a range of 1 to 51 flange segments, 2 to 46 flange segments, or 3 to 41 flange segments.

Embodiment 87

The bearing component, bearing component preassembly, or method of any one of embodiments 48-86, wherein the flange segments are spaced apart equally throughout the end of the bearing component.

Embodiment 88

The bearing component, bearing component preassembly, or method of any one of embodiments 48-87, wherein the flange segments are not spaced equally throughout the end of the bearing component.

Embodiment 89

The bearing component, bearing component preassembly, or method of any one of embodiments 48-88, wherein the flange segments extend from the generally annular sidewall at an angle of at least 45°, at least 50°, at least 55°, or at least 80°.

Embodiment 90

The bearing component, bearing component preassembly, or method of any one of embodiments 48-89, wherein the flange segments extend from the generally annular sidewall at an angle of no greater than 130°, no greater than 125°, or no greater than 120°.

Embodiment 91

The bearing component, bearing component preassembly, or method of any one of embodiments 48-90, wherein the flange segments extend from the generally annular sidewall at an angle in a range of 45 to 130°, 50 to 125°, or 80 to 120°.

Embodiment 92

The bearing component, bearing component preassembly, or method of any one of embodiments 48-91, wherein the bearing component includes first and second circumferential ends that define an axial split.

Embodiment 93

The bearing component, bearing component preassembly, or method of any one of embodiments 48-92, wherein the bearing component includes first and second circumferential ends that define an axial split, and the first circumferential end includes a circumferential protrusion.

Embodiment 94

The bearing component, bearing component preassembly, or method of any one of embodiments 48-93, wherein the bearing component includes first and second circumferential ends that define an axial split, and the second circumferential end includes an indent adapted to receive the protrusion.

Embodiment 95

The bearing component, bearing component preassembly, or method of any one of embodiments 48-94, wherein the bearing component includes first and second circumferential ends that define an axial split, and the first and second circumferential ends of the bearing component are spaced apart, interlocked, or welded together.

Embodiment 96

The bearing component, bearing component preassembly, or method of any one of embodiments 48-95, wherein the metal substrate layer includes a steel, an aluminum, a bronze, a copper, a magnesium, a titanium, a nickel, a zinc, or any combination thereof.

Embodiment 97

The bearing component, bearing component preassembly, or method of any one of embodiments 48-96, wherein a low-friction layer is disposed adjacent to the substrate layer.

Embodiment 98

The bearing component, bearing component preassembly, or method of embodiment 97, wherein the low-friction layer includes a polymer, such as a polyketone, polyaramid, a thermoplastic polyimide, a polyetherimide, a polyphenylene sulfide, a polyethersulfone, a polysulfone, a polyphenylene sulfone, a polyamideimide, ultra high molecular weight polyethylene, a thermoplastic fluoropolymer, a polyamide, a polybenzimidazole, or any combination thereof.

Embodiment 99

The bearing component, bearing component preassembly, or method of any one of embodiments 48-98, wherein the bearing component includes at least two split features, at least three split features, at least four split features, at least five split features, or at least ten split features.

Embodiment 100

The bearing component, bearing component preassembly, or method of any one of embodiments 48-99, wherein the bearing component includes no greater than 50 split features, no greater than 45 split features, or no greater than 40 split features.

Embodiment 101

The bearing component, bearing component preassembly, or method of any one of embodiments 48-100, wherein the bearing component includes a plurality of split features and each are evenly spaced along a circumference of the radial flange.

Embodiment 102

The bearing component, bearing component preassembly, or method of any one of embodiments 48-101, wherein the bearing component includes a plurality of split features and are not evenly spaced along a circumference of the radial flange.

Embodiment 103

The bearing component, bearing component preassembly, or method of any one of embodiments 48-102, wherein the flange split extends entirely between an inner and outer perimeter of the radial flange.

EXAMPLES

Example 1

Example 1 includes the bearing component illustrated in FIG. 1. To form the bearing component of Example 1, a composite strip was provided having the shape illustrated in FIG. 6. The composite strip included a metal substrate layer comprising aluminum and an overlying low-friction layer comprising polytetrafluoroethylene.

The composite strip was machine fed into a channel and engaged with a mandrel so that the low-friction layer faces outwardly. The channel had dimensions substantially similar to the dimensions of the composite strip and the mandrel had a geometry and contour substantially similar to the desired geometry and contour of the final shaped bearing component. The composite strip was shaped around the contour of the mandrel at a rolling force of about 10 kN to form the generally annular sidewall 20 illustrated in FIG. 1. Once the generally annular sidewall 20 was formed, the radial flange 30 was formed by bending each the tabs 230 of FIG. 6 to extend radially outwardly from the generally annular sidewall 20. FIG. 1 illustrates a shaped radial flange at the first axial end 22 and an unshaped tab at the second axial end 24. The unshaped tab was also shaped into a radial flange along the fold line F. The gap features were formed into split features as the tabs were shaped into the radial flanges. No cracks were observed in the generally annular sidewall of the bearing component of Example 1.

Example 2

Example 1 includes the bearing component illustrated in FIG. 4. To form the bearing component of Example 1, a composite strip was provided having the shape of the bearing component preassembly 410 illustrated in FIG. 7. The composite strip included a metal substrate layer comprising aluminum and an overlying low-friction layer comprising polytetrafluoroethylene.

The composite strip was machine fed into a channel and engaged with a mandrel so that the low-friction layer faces inwardly. The channel had dimensions substantially similar to the dimensions of the composite strip and the mandrel had a geometry and contour substantially similar to the desired geometry and contour of the final shaped bearing component. The composite strip was shaped around the contour of the mandrel at a rolling force of about 10 kN to form the generally annular sidewall 20 illustrated in FIG. 4. Once the generally annular sidewall 20 was formed, the radial flange 30 was formed by bending each the tabs 230 of FIG. 7 to extend radially outwardly from the generally annular sidewall 20. FIG. 4 illustrates a shaped radial flange at the first axial end 22 and did not include a radial flange at the second axial end 24. The gap features were formed into split features as the tabs were shaped into the radial flanges. No cracks were observed in the generally annular sidewall of the bearing component of Example 2.

Example 3

Example 3 was similar to Example 1, except that in Example 3 the composite strip had additional tab segments which translated into additional flange segments. The composite strip of Example 3 had the shape of the bearing component 510 illustrated in FIG. 8 and the bearing component of Example 3 had the shape of the bearing component 610 illustrated in FIG. 9. No cracks were observed in the generally annular sidewall of the bearing component of Example 3.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A bearing component preassembly comprising:
a body including first and second opposite ends in an axial direction; and
a tab including at least two tab segments extending from one of the first and second ends of the body in an axial direction; and
a gap feature including an opening and a gap extending in an axial direction toward the opening,
wherein the at least two tab segments are separated by the gap and the opening has a transverse width TWO that is greater than a transverse width TWI of an intersection between the gap and the opening, wherein the opening is arcuate, oval, or elliptic.

2. A bearing component comprising:
the bearing component preassembly of claim 1 shaped so as to include:
a generally annular sidewall shaped from the body so as to have a central axis and define a first and a second opposite ends in an axial direction; and
a radial flange shaped from the tab, which is bent so as to extend in a radial direction from one of the first and second ends of the generally annular sidewall.

3. The bearing component preassembly of claim 1, wherein at least a portion of the gap is defined by opposing edges of adjacent tab segments.

4. The bearing component preassembly of claim 1, wherein
the tab segments each have an axial height $AH_T$,
the body has a transverse value $TV_B$ equal to the transverse width $TW_B$ of the body divided by $\pi$, and
the ratio $AH_T:TV_B$ is at least 2:1.

5. The bearing component preassembly of claim 1, wherein the tab segments each have an axial height $AH_T$ of at least 1 mm.

6. The bearing component preassembly of claim 1, wherein the bearing component preassembly includes at least 3 tab segments.

7. The bearing component preassembly of claim 1, wherein the bearing component preassembly includes a first transverse end and an opposite second transverse end together adapted to define an axial split when the body is shaped into the generally annular sidewall.

8. The bearing component preassembly of claim 1, wherein a low-friction layer is disposed adjacent to a substrate layer on the preassembly.

9. The bearing component preassembly of claim 1, wherein a low-friction layer is disposed adjacent to a substrate layer on the preassembly, and the low-friction layer comprises a polymer including a polyketone, polyaramid, a thermoplastic polyimide, a polyetherimide, a polyphenylene sulfide, a polyethersulfone, a polysulfone, a polyphenylene sulfone, a polyamideimide, ultra high molecular weight polyethylene, a thermoplastic fluoropolymer, a polyamide, a polybenzimidazole, or any combination thereof.

10. A method of making a bearing component, comprising:
providing the bearing component preassembly of claim 1; and
shaping the bearing component preassembly to form the bearing component including:
a generally annular sidewall shaped from the body so as to have a central axis and define a first and a second opposite ends in an axial direction; and
a radial flange shaped from the tab, which is bent so as to extend in a radial direction from one of the first and second ends of the generally annular sidewall.

11. A bearing component comprising:
a generally annular sidewall having a central axis and defining a first and a second opposite ends in an axial direction, the sidewall comprising a metal substrate layer;
a radial flange comprising at least two adjacent flange segments extending from one of the first and second ends of the generally annular sidewall; and
at least one split feature, the split feature comprising:
a flange split defined by opposing edges of the adjacent flange segments, and
a sidewall split extending from the flange split an axial distance into the sidewall,
wherein the flange split and the sidewall split of each split feature are contiguous, wherein the sidewall split terminates in a rounded feature having an oval shape or an elliptical shape.

12. The bearing component of claim 11, wherein the radial flange includes at least two adjacent flange segments and the split feature is defined by opposing edges of the adjacent flange segments.

13. The bearing component of claim 11, wherein the flange segments each have a radial length $RL_F$, the generally annular sidewall has an inner diameter $ID_S$, and the ratio $RL_F:ID_S$ is at least 2:1.

14. The bearing component of claim 11, wherein the bearing component includes at least 3 flange segments.

15. The bearing component of claim 11, wherein the bearing component includes first and second circumferential ends that define an axial split.

16. The bearing component of claim 11, wherein a low-friction layer is disposed adjacent to the substrate layer.

17. The bearing component of claim 16, wherein the low-friction layer includes a polymer, such as a polyketone, polyaramid, a thermoplastic polyimide, a polyetherimide, a polyphenylene sulfide, a polyethersulfone, a polysulfone, a polyphenylene sulfone, a polyamideimide, ultra high molecular weight polyethylene, a thermoplastic fluoropolymer, a polyamide, a polybenzimidazole, or any combination thereof.

18. The bearing component of claim 11, wherein the bearing component includes at least two split features.

* * * * *